March 15, 1960  J. J. SMERKE  2,928,202
FISHING SINKER
Filed Aug. 14, 1958
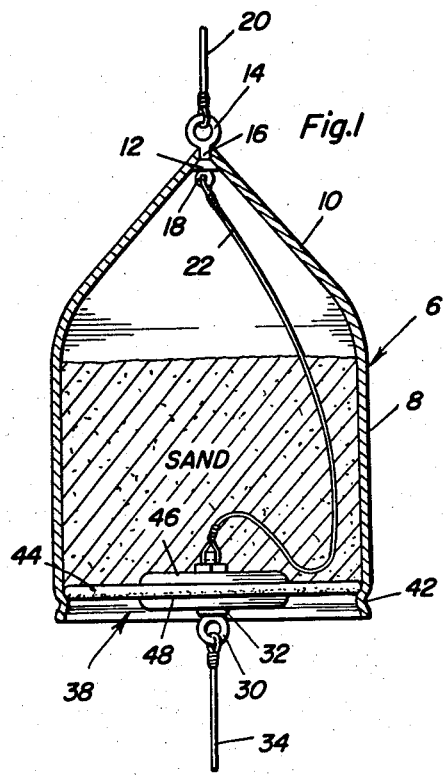
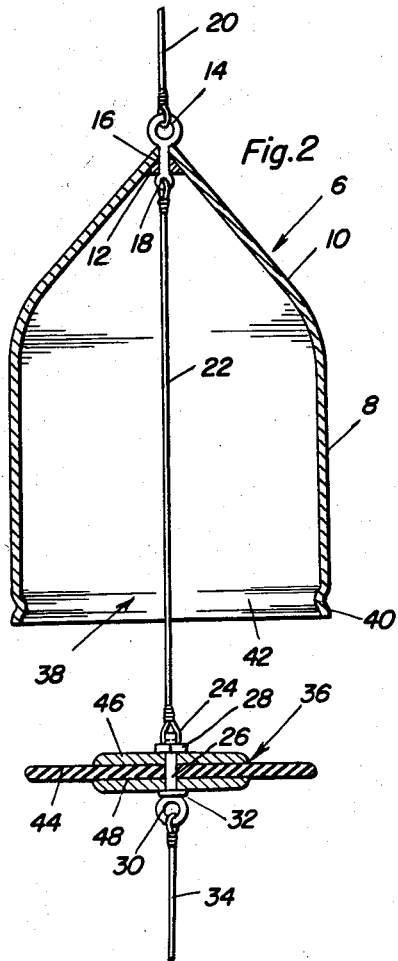
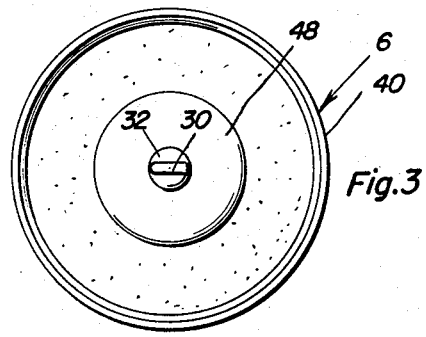
John J. Smerke
INVENTOR.

2,928,202

FISHING SINKER

John J. Smerke, Alameda, Calif.

Application August 14, 1958, Serial No. 754,970

2 Claims. (Cl. 43—43.12)

The present invention relates to a structurally novel sinker which is expressly suitable and adapted for deep sea fishing.

More particularly, the invention pertains to a hollow sinker providing a container for a load of sand, gravel, or a combination of such materials, said "load" being of suitable or prescribed weight in keeping with the fishing expedition being carried on at a given time. An insertable and removable plug-like closure is plugged into an otherwise open bottom of the container and a baited leader is connected to the closure so that when a strike is had, the plug-like closure is freed and pulled sufficiently far beyond the then open bottom of the container to permit the container to be emptied. With the sinker unloaded and lightened in weight, the fisherman is able to not only retrieve it and the closure but will find himself in a position to play the fish without hindrance from said sinker.

It is old in the art to provide a hollow body or equivalent container means to receive a loose weighty material with one end of the body connected to a trolling line and a trap door or closure at the other end of the body and means for retaining the door in closed position as well as a pull-actuated leader which at the time of a strike permits the door to be opened and the load emptied.

In carrying out a preferred embodiment of the invention the container is of hollow bell-like form and has an open bottom. The readily applicable and removable cover or closure is fitted removably into place and holds the load in its intended position. There is a flexible element which ties the cover or closure to the top of the container so that the closure is retrieved with the container.

Other objects, features and advantages becomes more readily apparent from the following description and the accompanying drawing.

In the drawing:

Fig. 1 is a view in section and elevation of the improved ready-to-use load discharging sinker.

Fig. 2 is a view similar to Fig. 1 with the load of sand discharged and with the pull-actuated cover or closure appearing in section and elevation.

Fig. 3 is a bottom plan view of the construction seen in Fig. 1.

Referring now to the drawing the body or container is of vertically elongated bell-like shape or form and is denoted generally by the numeral 6. It may be made of plastic, aluminum or any suitable sheet material. The main or body portion is generally cylindrical or circular in cross-section as at 8 and the upper end is conical at 10. There is a suitable collar of reinforcing material 12 fitted into the apex portion and this serves to accommodate the shank of a pin. There is a large eye 14 at the upper end of the pin 16 and a smaller eye 18 at the lower end thereof with the smaller eye extending into the interior of the container. The fishing line 20 is attached to the upper exteriorly disposed eye 14. A safety and retrieving line 22 is attached to the eye 18 and is of a suitable length that the loop 24 on the lower end thereof is connected with a bolt 26 just above the nut-equipped end 28. The lower end of this bolt is provided with an eye 30 and a flanged collar 32, said eye serving to accommodate the fishing line leader 34. This bolt serves to accommodatingly support the plug-like insertable and removable cover or closure 36 for the otherwise open bottom 38. The bottom edge portion is flared outwardly as at 40 and there is an endless indentation provided and this constitutes a suitable retaining bead or shoulder 42. The closure comprises a rubber or an equivalent disk 44 of the correct diameter which is centrally apertured to accommodate the bolt. This disk is sandwiched between steel or brass washers 46 and 48. The stem of the bolt pierces the disk and washers and thus serves to hold them in their intended assembled relationship.

In using the sinker all that is necessary is to load it with sand, gravel, or combination of sand and gravel or other suitable weighty material. Then, by inserting the plug the sand is trapped and the sinker is ready-for-use. When a fish strikes the plug or bottom is pulled far enough out for the load of sand to be dumped. However, and as already explained, the line 22 keeps the cover attached to the container, whereby both parts may be retrieved.

What is claimed as new is as follows:

1. An easy-to-retrieve sinker for deep sea fishing comprising a hollow shell-like body provided with a closed conical upper portion and an open bottom, the wall which encompasses said open bottom having an endless indentation and said indentation defining an inwardly projecting bead, said bead, in turn, providing a supporting and retaining ledge, said container being adapted to contain a dischargeable load of sand or the like which will be automatically dumped when a strike has been had, a closure covering the open bottom of the container and having its outer peripheral edge removably and frictionally seated on the ledge forming bead, a leader attached at its upper end to the central bottom of said closure and adapted, when pulled upon by a fish, to withdraw the closure in a manner to unload the sand, a pin mounted in the central upper portion of said container and having an external eye for attachment of a fishing line thereto and an internal eye, a retrieving flexible line in said container with its upper end attached to the internal eye, the lower end thereof being attached to a central portion of the closure.

2. An easy-to-retrieve sinker for deep sea fishing comprising a hollow shell-like body providing a container for a charge of sand sufficient in heaviness to enable the body to serve as a principal part of a sinker, said body being open at the bottom thereof, the top portion tapering upwardly and being conical and closed but provided with a fixedly joined line eye to which one end of a fishing line may be attached for purposes of suspending the body, and an insertable and removable closure fitted frictionally into and closing the otherwise open bottom, said closure being flexibly connected from one side of the central portion to the top of the body portion, and a baitable leader having one end attached to the central bottom of said closure, said closure functioning, when it is in closed position, to retain the load of sand and, when it has been pulled free from the open bottom of the container by the action of the leader, functioning to free the sand and to permit the same to be emptied through the then open bottom, the flexible connection between the closure and top of the body comprising a flexible safeguarding line of a length greater than the depth of the container so that when the closure has been freed to assume an open position, it is positioned a distance sufficiently from the open bottom to permit free discharge of the sand, the bottom edge portion of the container being flared outwardly through the medium of an endless shoulder-forming closure-retaining bead, said closure embodying a rubber disk the marginal edge of which is frictionally but yieldingly seated on said bead, and said bead constituting a supporting ledge for the disk.

References Cited in the file of this patent

UNITED STATES PATENTS

| | | |
|---|---|---|
| 927,732 | Korndorfer | July 13, 1909 |
| 1,917,967 | Green | July 11, 1933 |
| 2,709,317 | Pease | May 31, 1955 |
| 2,729,912 | Moffett | Jan. 10, 1956 |

FOREIGN PATENTS

| | | |
|---|---|---|
| 494,505 | Italy | 1954 |